US008284368B2

(12) United States Patent
Liao et al.

(10) Patent No.: US 8,284,368 B2
(45) Date of Patent: Oct. 9, 2012

(54) ARRAY SUBSTRATE AND FLAT DISPLAY DEVICE

(75) Inventors: Yi-Suei Liao, Hsin-Chu (TW); Chien-Liang Chen, Hsin-Chu (TW); Kai-Yuan Siao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 501 days.

(21) Appl. No.: 12/695,141

(22) Filed: Jan. 27, 2010

(65) Prior Publication Data

US 2011/0085098 A1 Apr. 14, 2011

(30) Foreign Application Priority Data

Oct. 8, 2009 (TW) ............................... 98134094 A

(51) Int. Cl.
*G02F 1/1343* (2006.01)

(52) U.S. Cl. ........... 349/144; 349/106; 349/139; 345/96

(58) Field of Classification Search ........................ None
See application file for complete search history.

(56) References Cited

U.S. PATENT DOCUMENTS

| | | | | |
|---|---|---|---|---|
| 4,812,017 | A * | 3/1989 | Piper | 349/144 |
| 6,256,004 | B1 | 7/2001 | Izumi | |
| 6,323,871 | B1 | 11/2001 | Fujiyoshi | |
| 7,477,224 | B2 | 1/2009 | Song | |
| 2003/0151584 | A1 | 8/2003 | Song | |
| 2007/0091044 | A1 | 4/2007 | Park | |

FOREIGN PATENT DOCUMENTS

| | | | |
|---|---|---|---|
| CN | 1427391 | A | 7/2003 |
| CN | 101226290 | A | 7/2008 |

* cited by examiner

*Primary Examiner* — Lucy Chien
(74) *Attorney, Agent, or Firm* — Winston Hsu; Scott Margo

(57) ABSTRACT

A flat display device includes an array substrate. The array substrate includes a plurality of gate lines, data lines and pixels. The pixels include a plurality of first pixel units and second pixel units, and each of the first pixel units and each of the second pixel units include more than three pixels. The first pixel units and the second pixel units disposed in between two adjacent data lines are arranged alternately, wherein the first pixel units are electrically connected with one of the two adjacent data lines, and the second pixel units are electrically connected with the other data line.

14 Claims, 11 Drawing Sheets

ARRAY SUBSTRATE AND FLAT DISPLAY DEVICE

BACKGROUND OF THE INVENTION

1. Field of the Invention

The present invention relates to a flat display device, and more particularly to a flat display device having a low crosstalk effect.

2. Description of the Prior Art

The flat display device, based on different driving modes, may be generally divided into two types including a single-gate type flat display device and a tri-gate type flat display device. When displaying images under the same resolution, the number of gate lines of the tri-gate type flat display device is three times greater than that of the single-gate type flat display device, while the number of data lines of the tri-gate type flat display devices is reduced to one-third of that of the single-gate type flat display device. Hence, the tri-gate type flat display device uses more gate drivers, but less source drivers. Since the cost and power consumption of the gate driver are less than those of the source driver, the tri-gate type flat display device is beneficial for its low cost and low power consumption.

Notwithstanding its low cost and low power consumption, the conventional tri-gate type flat display device yet requires to be further improved in displaying quality.

SUMMARY OF THE INVENTION

It is therefore one of the objectives of the present invention to provide a flat display device to improve the displaying quality.

According to a preferred embodiment of the present invention, an array substrate is provided. The array substrate includes a plurality of gate lines, a plurality of data lines, and a plurality of pixels. The gate lines intersect with the data lines and form a plurality of pixel regions. The pixels are respectively disposed in each of the corresponding pixel regions. The pixels include a plurality of buffering pixel units, a plurality of first pixel units, and a plurality of second pixel units. The quantity of pixels of each of the first pixel units is A, the quantity of pixels of each of the second pixel units is A, and the quantity of pixels of each of the buffering pixel units is D, wherein A is a positive integer greater than or equal to 3, and D is a positive integer smaller than A. Each of the buffering pixel units is disposed between any two adjacent data lines and corresponding to an endpoint of each data line, and the first pixel units and the second pixel units are disposed between any two adjacent data lines and follow each of the buffering pixel units along an extending direction of the data line. The first pixel units and the second pixel units disposed between any two adjacent data lines are arranged alternately, the first pixel units are electrically connected with one of the two adjacent data lines, and the second pixel units are electrically connected with the other data line of the two adjacent data lines.

According to another preferred embodiment of the present invention, an array substrate is provided. The array substrate includes a plurality of gate lines, a plurality of data lines, and a plurality of pixels. The gate lines intersect with the data lines and form a plurality of pixel regions. The pixels are respectively disposed in each of the corresponding pixel regions. The pixels include a plurality of first pixel units and a plurality of second pixel units, the quantity of pixels of each of the first pixel units is A, the quantity of pixels of each of the second pixel units is A, and A is a positive integer greater than or equal to 3. The first pixel units and the second pixel units are disposed between any two adjacent data lines and arranged along an extending direction of the data line. The first pixel units and the second pixel units disposed between any two adjacent data lines are arranged alternately, the first pixel units are electrically connected with one of the two adjacent data lines, and the second pixel units are electrically connected with the other data line of the two adjacent data lines. The pixels in each of the first pixel units have C kinds of colors, the pixels in each of the second pixel units have C kinds of colors, and C is a positive integer greater than or equal to 3 and is a factor of A. A color arrangement sequence of the pixels in each of the first pixel units is identical to that of the pixels in each of the second pixel units.

According to yet another preferred embodiment of the present invention, a flat display device is provided. The flat display device includes the array substrate according to the aforementioned array substrates.

The array substrate of the flat display device of one embodiment of the present invention includes a plurality of pixels disposed between two adjacent data lines, and the pixels further include first pixel units and second pixel units. Each first pixel unit includes three or more pixels and each second pixel unit includes three or more pixels, where the first pixel units and the second pixel units are electrically connected with different data lines, respectively. Accordingly, when displaying vertical stripe patterns, the coupling effect on the common signal resulted from the high-low level alterations of data signals can be decreased. Thus, generation of the crosstalk effect can be reduced to improve the displaying quality.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be made in details. The preferred embodiments of the present invention are illustrated in the accompanying drawings with numbered elements. In addition, the preferred embodiments exemplarily utilize a tri-gate flat display device, such as a tri-gate flat liquid crystal display, to illustrate the flat display device of the present invention. But the flat display device of the present invention is not limited herein, and may be other suitable types of flat display devices.

Figure 1:
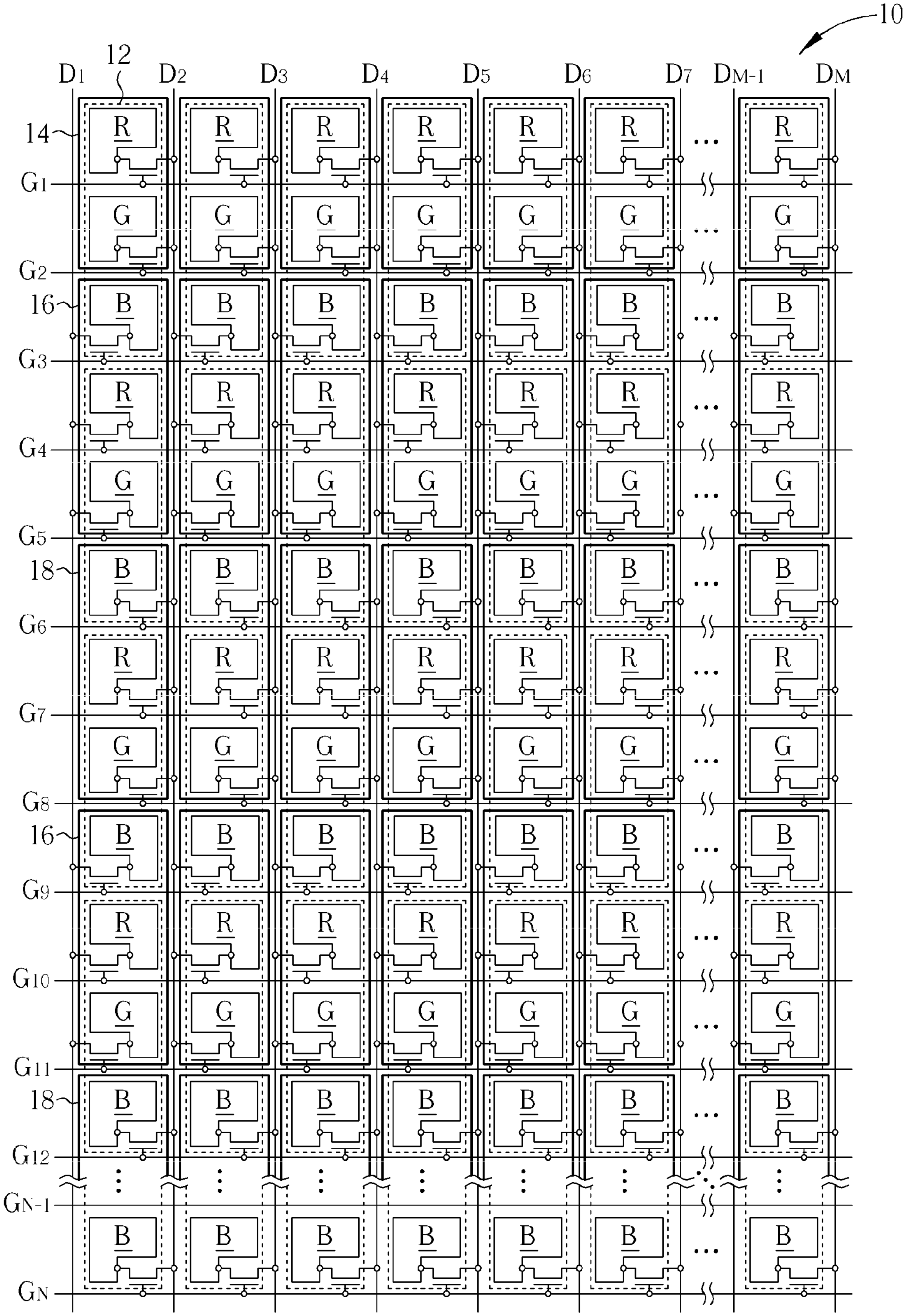
FIG. 1 is a schematic diagram illustrating an array substrate according to a first preferred embodiment of the present invention.

Refer to FIG. 1. FIG. 1 is a schematic diagram illustrating an array substrate according to a first preferred embodiment of the present invention. As shown in FIG. 1, the array substrate 10 of the present embodiment includes a plurality of gate lines $G_1$, $G_2$, . . . , $G_N$, a plurality of data lines $D_1$, $D_2$, . . . , $D_M$ which are substantially perpendicular to the gate lines $G_1$, $G_2$, . . . , $G_N$, a plurality of switches (not shown in the figure) electrically connected with the corresponding gate lines and data lines, a plurality of pixel electrodes (not shown in the figure) electrically connected with the corresponding switches, and a plurality of displaying pixels 12. The switches may be, for instance, thin film transistors, but not limited. Each of the displaying pixels 12 includes a plurality of pixels (also referred to as sub-pixels), which are for displaying images of C kinds of different colors, where C is a positive integer, arranged along an extending direction of the data line. For example, in the present embodiment, each of the displaying pixels 12 includes three kinds of pixels for displaying images of different colors, such as a red pixel R, a green pixel G, and a blue pixel B, wherein the color arrangement of the pixels is in a sequence of the red pixel R, the green pixel G, and the blue pixel B. The number and the color arrangement of the pixels of each displaying pixel 12 are not limited herein. The gate lines $G_1$, $G_2$, . . . , $G_N$ intersect with the data lines $D_1$, $D_2$, . . . , $D_M$ to form a plurality of pixel regions, and the pixels of each displaying pixel 12 are respectively disposed in each of the corresponding pixel regions.

In the present embodiment, all pixels, based on different function and connecting methods, include a plurality of buffering pixel units 14, a plurality of first pixel units 16, and a plurality of second pixel units 18. The quantity of pixels of each of the first pixel units 16 is A, the quantity of pixels of each of the second pixel units 18 is A, and the quantity of pixels of each of the buffering pixel units 14 is D, wherein A is a positive integer greater than or equal to 3, and D is a positive integer smaller than A. In the present embodiment, as shown in FIG. 1, A is equal to 3 and D is equal to 2, but not limited. In addition, the pixels of each first pixel unit 16 have C kinds of colors, and the pixels of each second pixel unit 18 also have C kinds of colors, wherein C is an integer greater than or equal to 3 and is a factor of A, and a color arrangement sequence of the pixels of each first pixel unit 16 is identical to that of the pixels of each second pixel unit 18. In the present embodiment, A is equal to 3, D is equal to 2, and C is equal to 3, but not limited. Moreover, each buffering pixel unit 14 is disposed between any two adjacent data lines and corresponding to an endpoint of each data line, i.e. each buffering pixel units 14 is disposed at an initial position of the pixels of each column. The first pixel units 16 and the second pixel units 18 are disposed between any two adjacent data lines, and follow each of the buffering pixel units 14 along the extending direction of the data line. The arrangement of the buffering pixel units 14 is based on the requirement of the designer to offset or to designate the color of the first pixel of actual displaying image. In detail, as shown in FIG. 1, the color arrangement sequence of the pixels of the displaying pixels 12 is in a sequence of red, green, and blue recurrently from up to down. When the number of pixels of the buffering pixel units 14 is 2 (e.g. a red pixel R and a green pixel G), the first pixel of the first pixel units 16 successively following the buffering pixel units 14 is a blue pixel B. Alternatively, it may depends on the requirement of the designer to adjust the first pixel of the first pixel units 16 to be a pixel with another color, such as a red pixel R or a green pixel G. Furthermore, the first pixel units 16 and the second pixel units 18 disposed between any two adjacent data lines are arranged alternately, wherein the first pixel units 16 are electrically connected with one of the two adjacent data lines, such as the data line on the left side. The second pixel units 18 are electrically connected with the other data line, such as the data line on the right side. In addition, the pixels disposed between any two adjacent data lines are respectively electrically connected with the different gate lines, and the data lines are driven by a column inversion method, for example.

Figure 2:
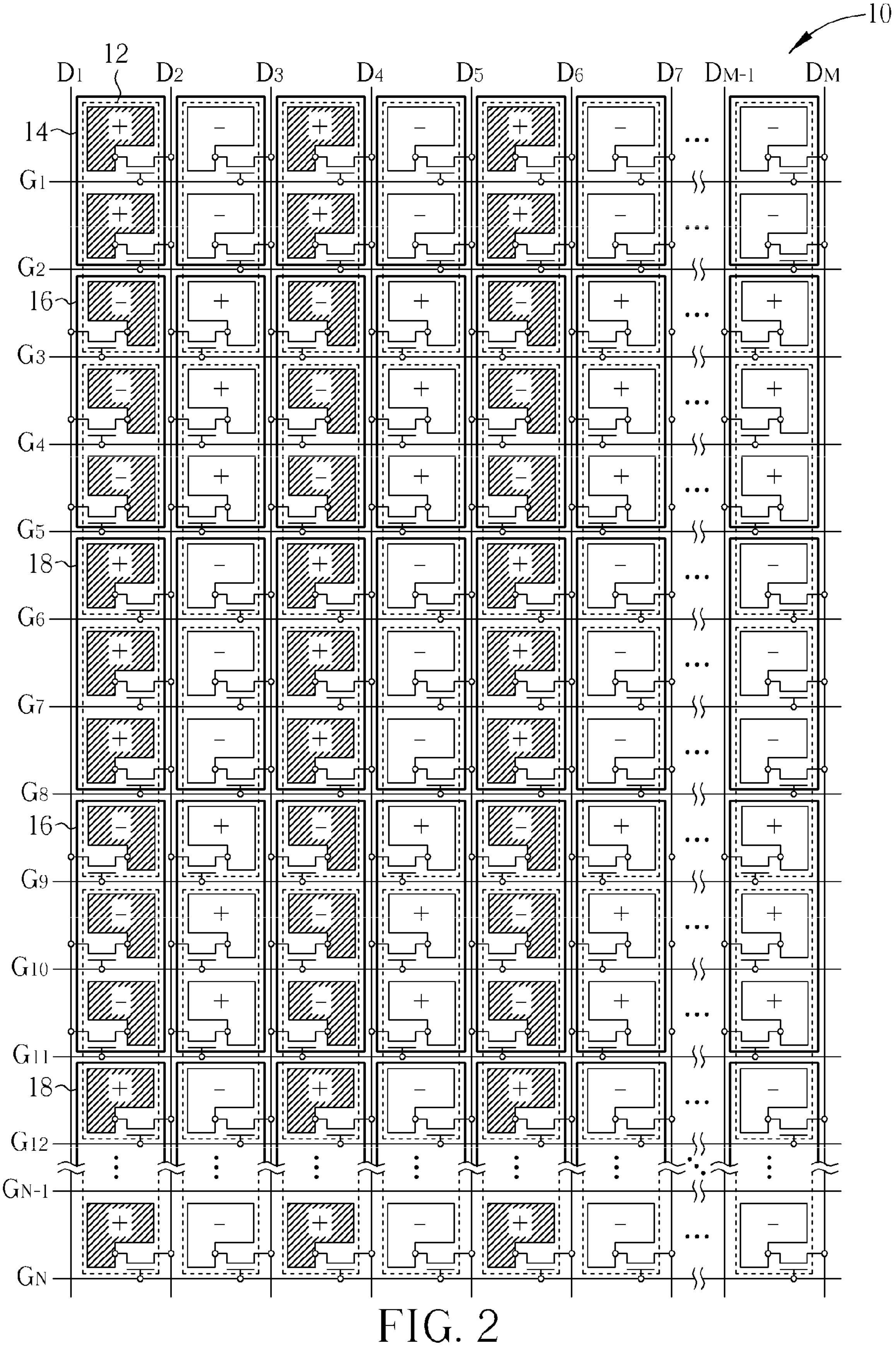
FIG. 2 is a schematic diagram illustrating the array substrate of the first preferred embodiment applied in a flat display device displaying an image of vertical stripe pattern.

Please refer to FIG. 2. FIG. 2 is a schematic diagram illustrating the array substrate of the first preferred embodiment applied in a flat display device displaying an image of vertical stripe pattern. As shown in FIG. 2, when displaying an image of vertical stripe pattern, i.e. when displaying an image of stripe patterns having black and white stripes arranged alternately and perpendicular to the direction of the gate line, the displaying pixels 12 at the odd-numbered columns are in a dark state, and the displaying pixels 12 at the even-numbered columns are in a bright state. Take the data line $D_2$ as an example. The data line $D_2$ is electrically connected with the buffering pixel units 14 on the left side of the data line $D_2$, the second pixel units 18 on the left side of the data line $D_2$, and the first pixel units 16 on the right side of the data line $D_2$. Accordingly, when displaying the image of vertical stripe pattern, the data line $D_2$ provides a data signal Vdata with high level to the buffering pixel units 14 and the second pixel units 18 on the left side of the data line $D_2$ for making them being in the dark state, and provides a data signal Vdata with low level to the first pixel units 16 on the right side of the data line $D_2$ for making them being in the bright state.

Figure 3:
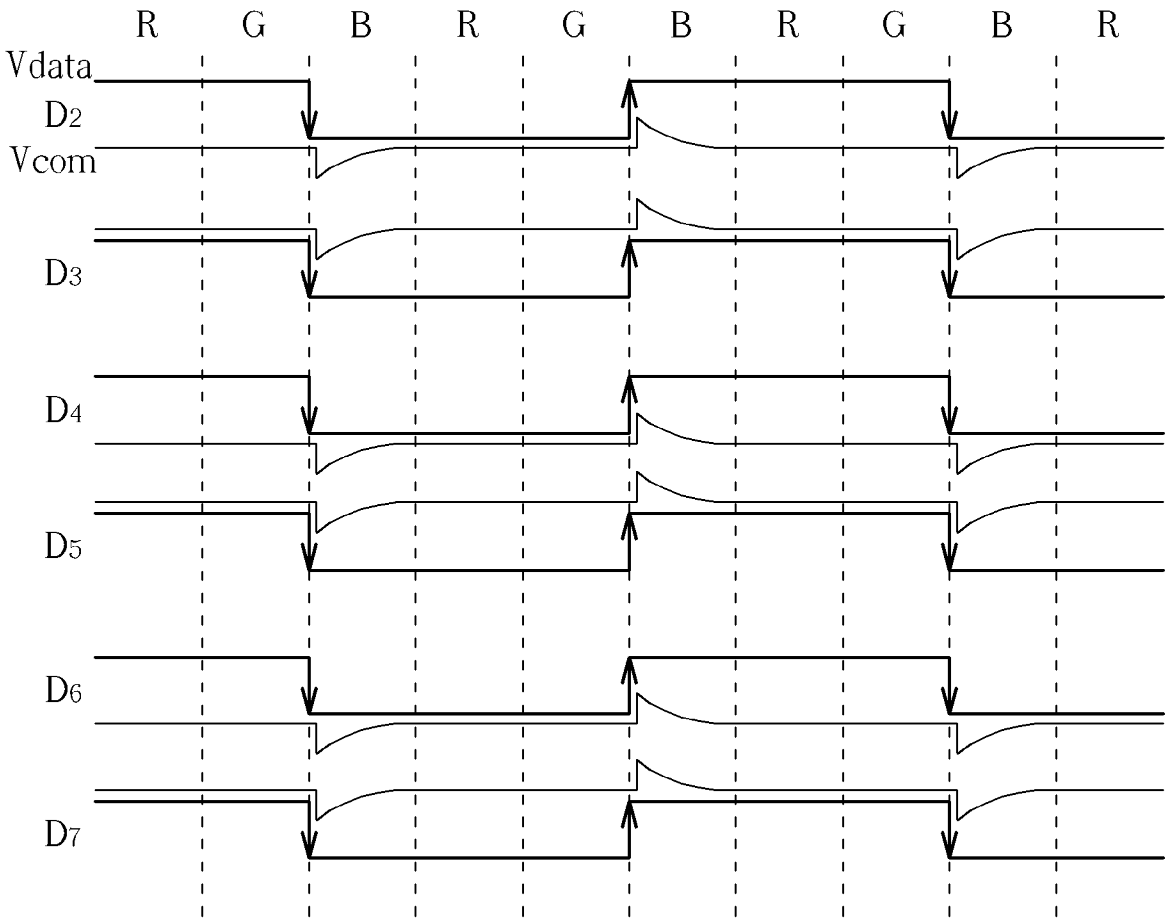
FIG. 3 is a schematic diagram illustrating signals of data lines and a signal of a common line as the array substrate of the first preferred embodiment applied in a flat display device displaying an image of vertical stripe pattern.

Refer to FIG. 3 and FIG. 2. FIG. 3 is a schematic diagram illustrating signals of data lines and a signal of a common line as the array substrate of the first preferred embodiment applied in a flat display device displaying an image of vertical stripe pattern. As shown in FIG. 2 and FIG. 3, when displaying an image of vertical stripe pattern, level alterations of the data signal Vdata of each pixel provided by the data line $D_2$ in different scanning time sequences are shown as illustrated in FIG. 3. The data lines $D_2$ provides two data signals Vdata with high level to two pixels R and G of the buffering pixel units 14 in sequence, and then the data lines $D_2$ provides three data signals Vdata with low level to three pixels B, R, and G of the first pixel units 16 in sequence. Subsequently, the data lines $D_2$ provides three data signals Vdata with high level to three pixels B, R, and G of the second pixel units 18 in sequence, and on the analogy of this. As a result, in the process of providing the data signals Vdata by the data line $D_2$, the acquiring signal of the first pixel of each first pixel unit 16 (i.e. the blue pixel B) dramatically changes from high level to low level, and the acquiring signal of the first pixel of each second pixel units 18 (i.e. the blue pixel B) dramatically changes from low level to high level. Under the condition that the data signals Vdata changes from high level to low level or from low level to high level, a coupling effect is generated between the data signals Vdata and the common signal Vcom, which makes the common signal Vcom produce ripples. The main characteristic of the present embodiment lies in that, when displaying the vertical stripe pattern, the high-low level alterations of the data signal Vdata do not occur between all adjacent pixels, but only occur in a time sequence of the data signal Vdata when transmitted to first pixel of the first pixel unit 16 and when transmitted to the first pixel of second pixel units 18. Therefore, the frequency of the ripples generated by the common signal Vcom effectively decreases as the increase of the number of the pixels included in the first pixel units 16 and the second pixel units 18. For instance, in the present embodiment, the high-low level alterations of the data signal only occur one time in every three scans so as to decrease the occurrence of the crosstalk effect. Moreover, in order to further improve the displaying quality, in the present embodiment, the color of the first pixel of each first pixel unit 16 is the same with the color of the first pixel of each second pixel unit 18. For example, the color is chosen from the colors which are less sensitive to human eyes, such as blue, so that an observer may not easily notice the influence of the crosstalk effect on displaying images. It should be noted that the color of less sensitive to human eyes is not limited to blue and may be determined according to wavelength distributions of back lights and characteristics of color filters.

As explained previously, in the array substrate of the present embodiment, the pixels of the same column include a plurality of first pixel units and a plurality of second pixel units, wherein each of the first pixel units includes more than three pixels, and each of the second pixel units includes more than three pixels. The color arrangement sequences of the pixels of the first pixel units and/or the second pixel units are identical, and the colors of pixels in each pixel unit may include or be selected from the group consisting of red, green, blue, white, yellow, magenta, and cyan, but not limited. Also, the first pixel units and the second pixel units are electrically connected with different data lines, respectively. As a result, as the flat display device displays the image of vertical stripe pattern, the occurrence of the high-low level alterations of the data signal can be decreased, and the occurrence of coupling effect on the common signal can be accordingly decreased. Thus, the crosstalk effect can be reduced to improve the displaying quality. The flat display device of the present invention is not limited to the aforementioned embodiment and has various modified configurations which can achieve the aforementioned effect. Other embodiments of the array substrate and the flat display device of the present invention are explained as follows. To simplify the description and for the convenience of comparison between each of the embodiments of the present invention, identical elements are denoted by identical numerals. Also, only the differences are illustrated, and repeated descriptions are not redundantly given.

Figure 4:
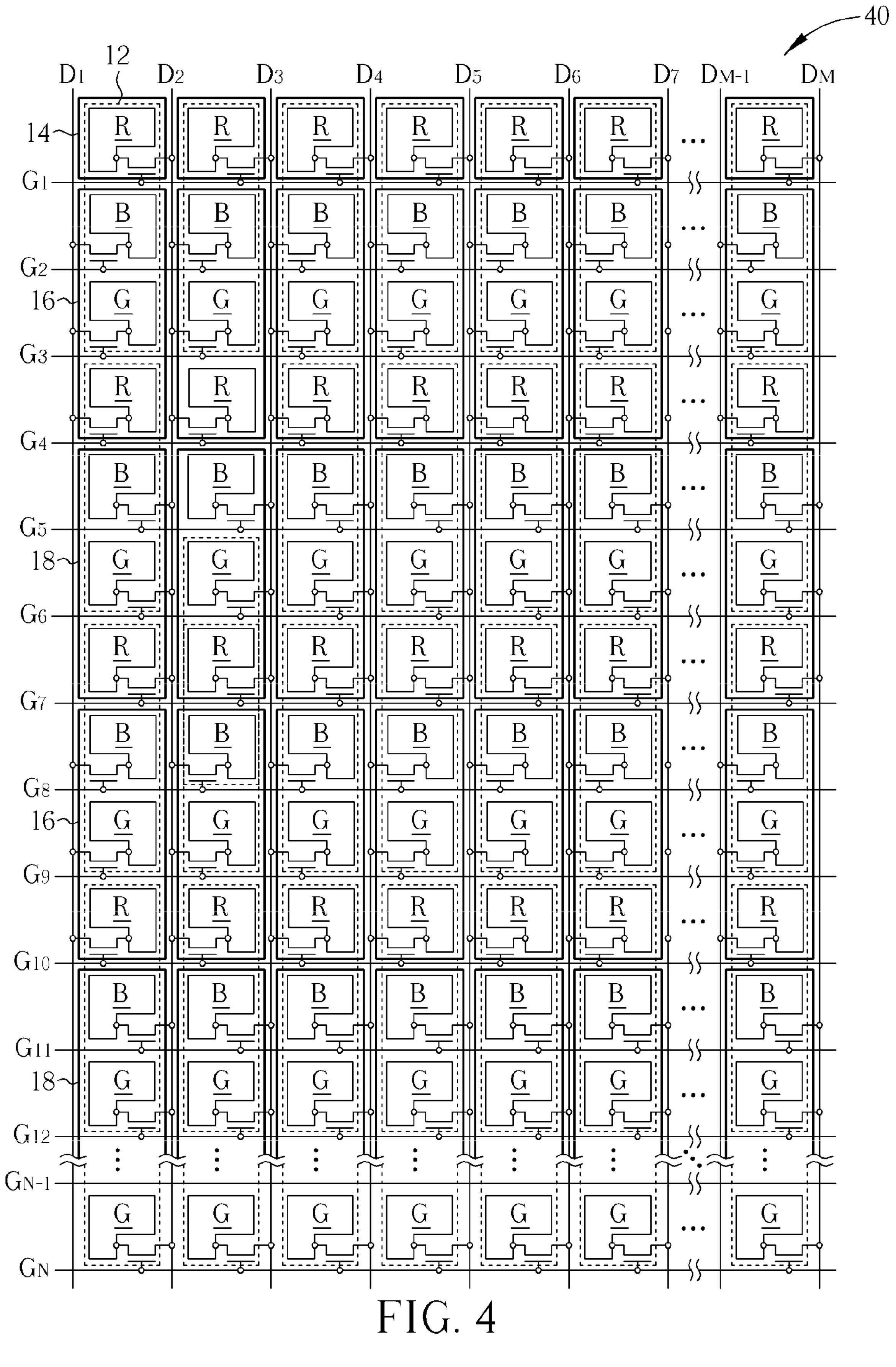
FIG. 4 is a schematic diagram illustrating an array substrate according to a second preferred embodiment of the present invention.

Please refer to FIG. 4. FIG. 4 is a schematic diagram illustrating an array substrate 40 according to a second preferred embodiment of the present invention. As shown in FIG. 4, the array substrate 40 of the present embodiment is a variation of the first preferred embodiment, and the difference between the second preferred embodiment and the first preferred embodiment is that the color arrangement of the pixels of each displaying pixel 12 is in a sequence of the red pixel R, the blue pixel B, and the green pixel G. In addition, each first pixel unit 16 and each second pixel unit 18 respectively has three pixels for displaying different color images, but each buffering pixel units 14 only has one pixel, i.e. A is equal to 3, D is equal to 1, and C is equal to 3.

Figure 5:
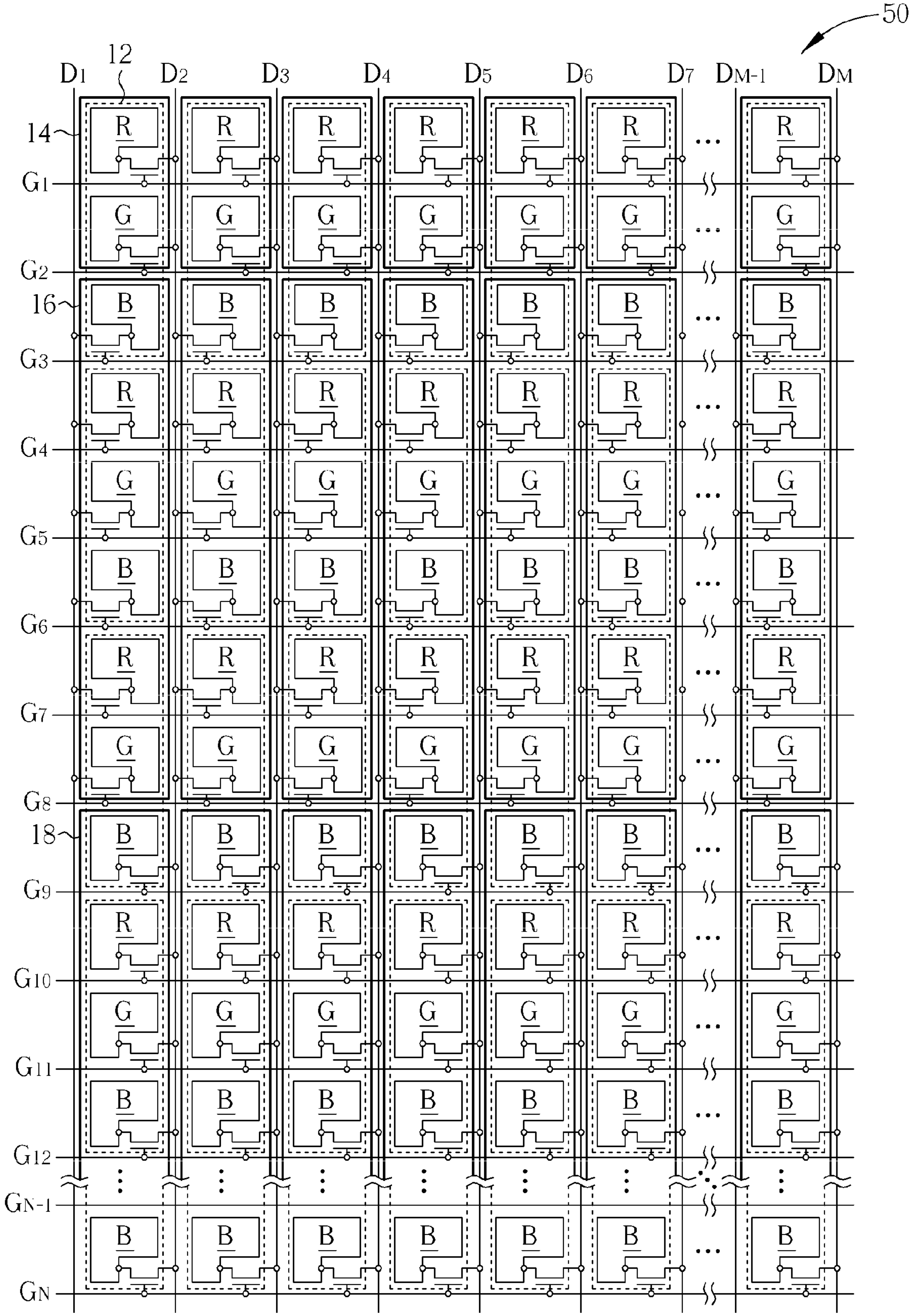
FIG. 5 is a schematic diagram illustrating an array substrate according to a third preferred embodiment of the present invention.

Please refer to FIG. 5. FIG. 5 is a schematic diagram illustrating an array substrate 50 according to a third preferred embodiment of the present invention. As shown in FIG. 5, each displaying pixel 12 of the present embodiment includes three pixels, and the color arrangement of the pixels of each displaying pixel 12 is in a sequence of the red pixel R, the green pixel G, and the blue pixel B. Each buffering pixel unit 14 has two pixels, but each first pixel unit 16 and each second pixel unit 18 both have six pixels. The six pixels are two red pixels R, two green pixels G, and two blue pixels B, i.e. A is equal to 6, D is equal to 2, and C is equal to 3. In other words, the pixels included in each first pixel unit 16 and in each second pixel unit 18 are sequentially the blue pixel B, the red pixel R, the green pixel G, the blue pixel B, the red pixel R, and the green pixel G. Accordingly, compared to the first preferred embodiment, the occurrence of the high-low level alterations of the data signal can be further decreased, i.e. the high-low level alterations of the data signal only occur one time in every six scans. Therefore, the frequency of the crosstalk effect can be reduced, and the displaying quality can be improved.

Figure 6:
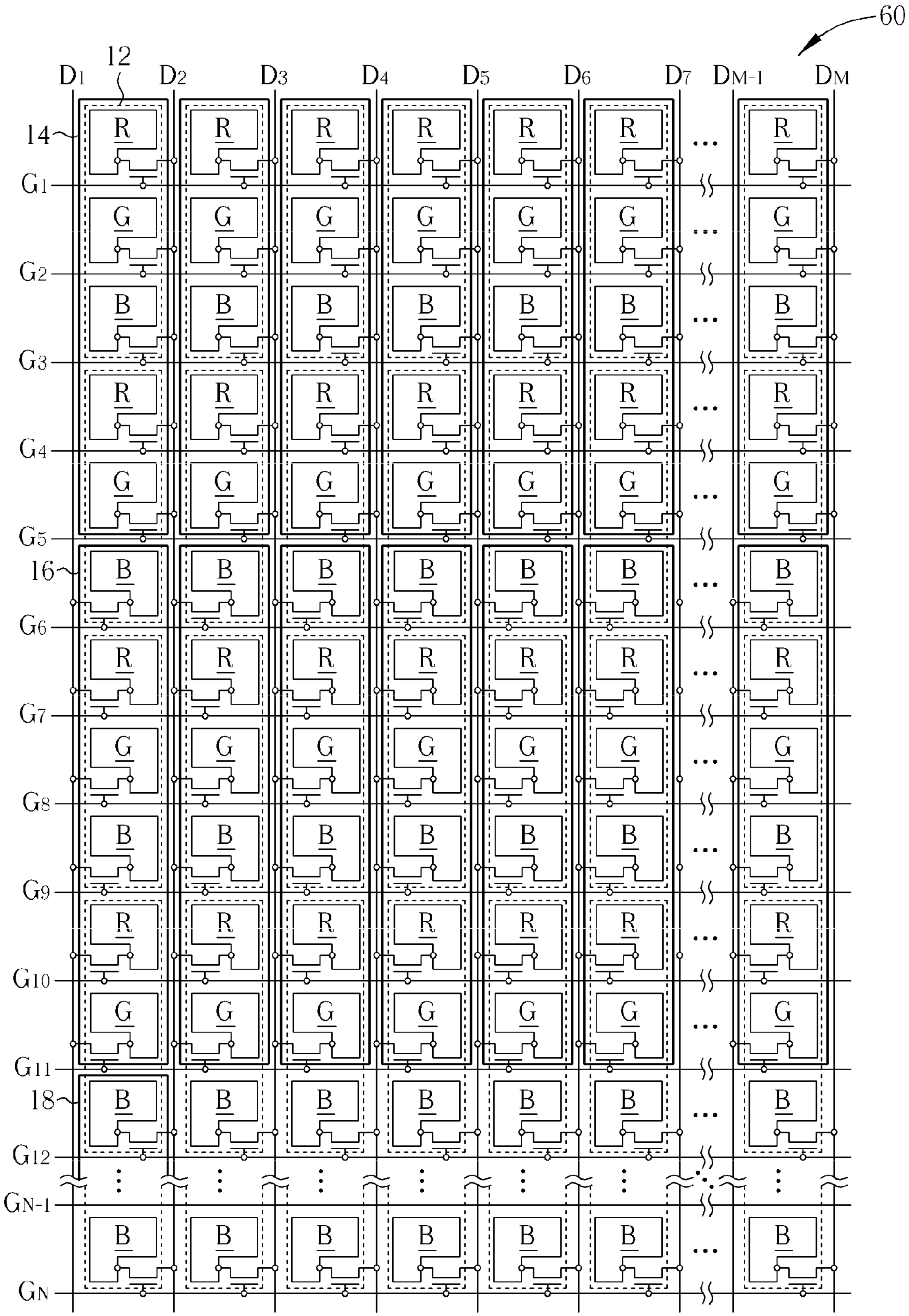
FIG. 6 is a schematic diagram illustrating an array substrate according to a fourth preferred embodiment of the present invention.

Please refer to FIG. 6. FIG. 6 is a schematic diagram illustrating an array substrate 60 according to a fourth preferred embodiment of the present invention. As shown in FIG. 6, each displaying pixel 12 of the present embodiment includes three pixels, and the color arrangement of the pixels of each displaying pixel 12 is in a sequence of the red pixel R, the green pixel G, and the blue pixel B. Each buffering pixel unit 14 has five pixels, and each first pixel unit 16 and each second pixel unit 18 both have six pixels. The six pixels are two red pixels R, two green pixels G, and two blue pixels B, i.e. A is equal to 6, D is equal to 5, and C is equal to 3. In other words, the pixels included in each first pixel unit 16 and in each second pixel unit 18 are sequentially the blue pixel B, the red pixel R, the green pixel G, the blue pixel B, the red pixel R, and the green pixel G.

Figure 7:
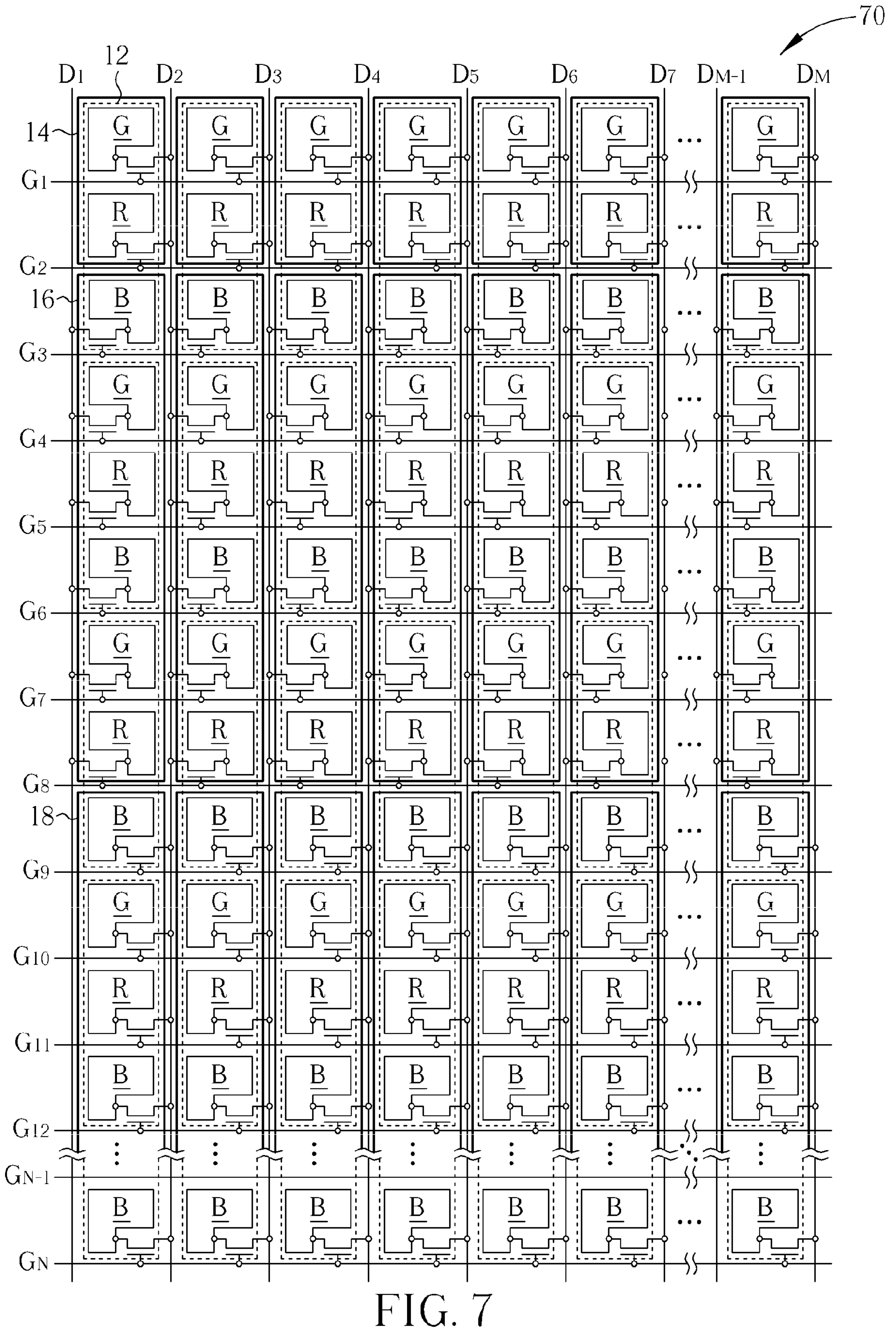
FIG. 7 is a schematic diagram illustrating an array substrate according to a fifth preferred embodiment of the present invention.

Please refer to FIG. 7. FIG. 7 is a schematic diagram illustrating an array substrate 70 according to a fifth preferred embodiment of the present invention. As shown in FIG. 7, each displaying pixel 12 of the present embodiment includes three pixels, and the color arrangement of the pixels of each displaying pixel 12 is in a sequence of the green pixel G, the red pixel R, and the blue pixel B. Each buffering pixel unit 14 has two pixels, and each first pixel unit 16 and each second pixel unit 18 both have six pixels. The six pixels are two red pixels R, two green pixels G, and two blue pixels B, i.e. A is equal to 6, D is equal to 2, and C is equal to 3. In other words, the pixels included in each first pixel unit 16 and in each second pixel unit 18 are sequentially the blue pixel B, the green pixel G, the red pixel R, the blue pixel B, the green pixel G, and the red pixel R.

Figure 8:
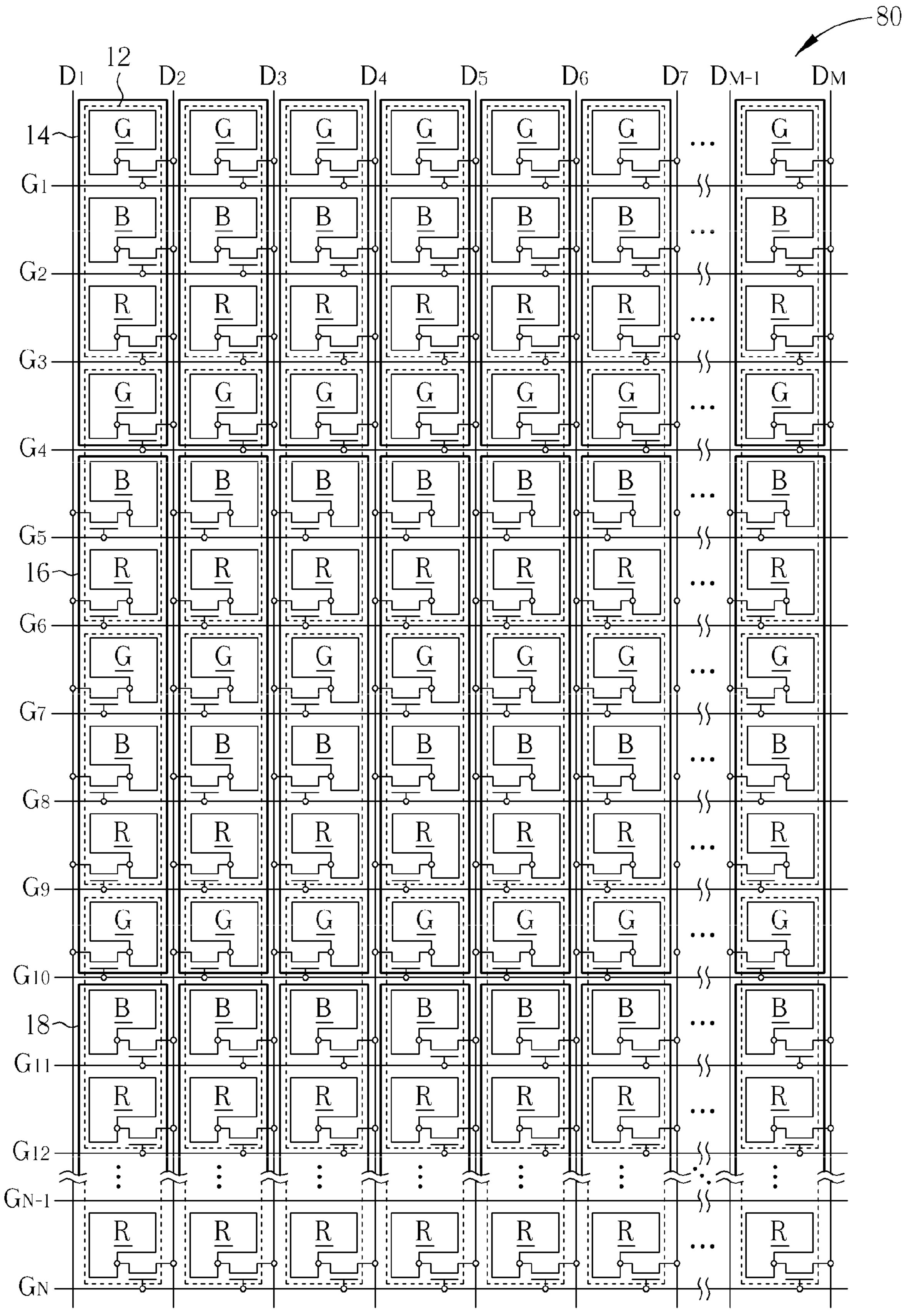
FIG. 8 is a schematic diagram illustrating an array substrate according to a sixth preferred embodiment of the present invention.

Please refer to FIG. 8. FIG. 8 is a schematic diagram illustrating an array substrate 80 according to a sixth preferred embodiment of the present invention. As shown in FIG. 8, each displaying pixel 12 of the present embodiment includes three pixels, and the color arrangement of the pixels of each displaying pixel 12 is in a sequence of the green pixel G, the blue pixel B, and the red pixel R. Each buffering pixel unit 14 has four pixels, and each first pixel unit 16 and each second pixel unit 18 both have six pixels. The six pixels are two red pixels R, two green pixels G, and two blue pixels B, i.e. A is equal to 6, D is equal to 4, and C is equal to 3. In other words, the pixels included in each first pixel unit 16 and in each second pixel unit 18 are sequentially the blue pixel B, the red pixel R, the green pixel G, the blue pixel B, the red pixel R, and the green pixel G.

Figure 9:
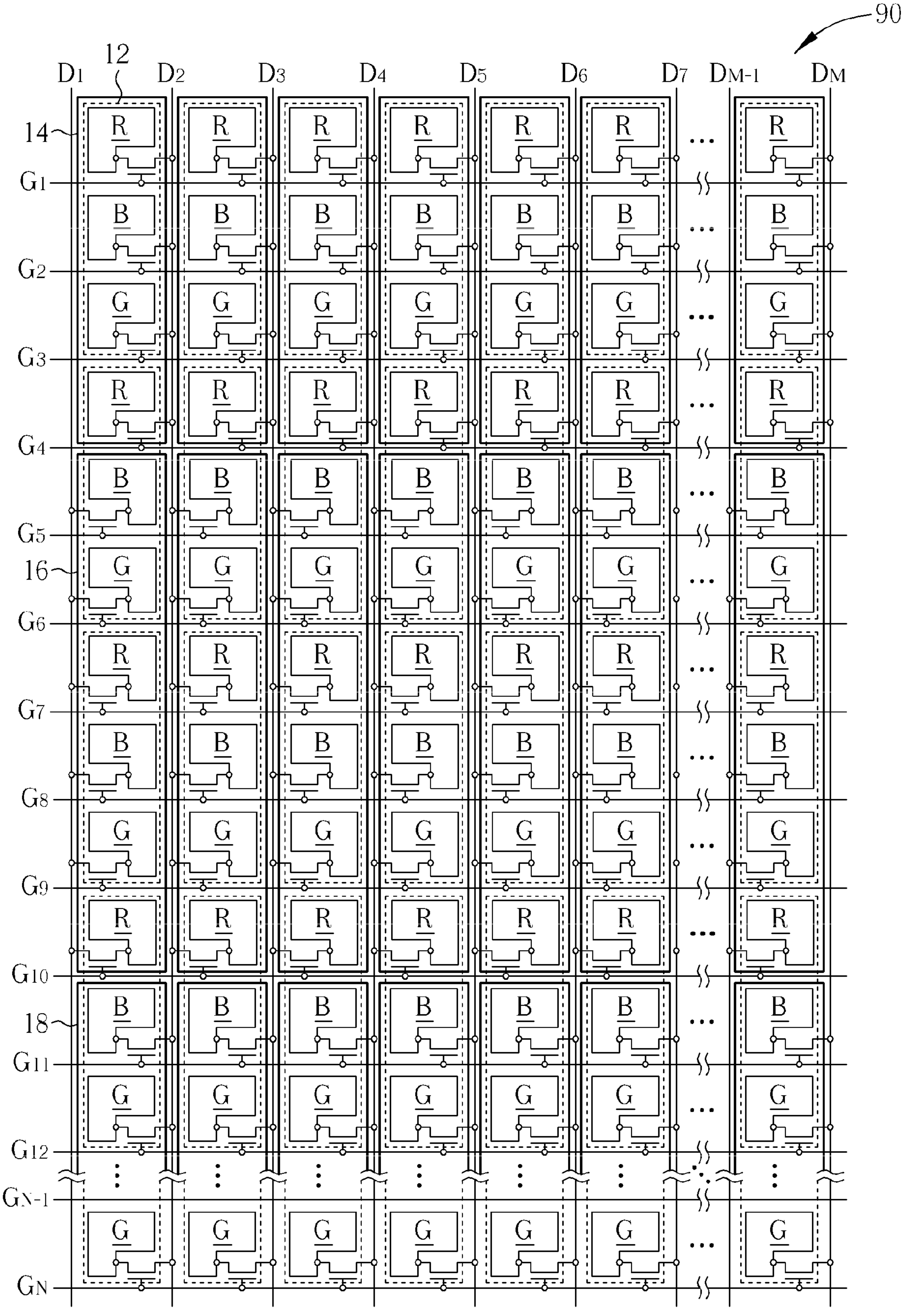
FIG. 9 is a schematic diagram illustrating an array substrate according to a seventh preferred embodiment of the present invention.

Please refer to FIG. 9. FIG. 9 is a schematic diagram illustrating an array substrate 90 according to a seventh preferred embodiment of the present invention. As shown in FIG. 9, each displaying pixel 12 of the present embodiment includes three pixels, and the color arrangement of the pixels of each displaying pixel 12 is in a sequence of the red pixel R, the blue pixel B, and the green pixel G. Each buffering pixel unit 14 has four pixels, and each first pixel unit 16 and each second pixel unit 18 both have six pixels. The six pixels are two red pixels R, two green pixels G, and two blue pixels B, i.e. A is equal to 6, D is equal to 4, and C is equal to 3. In other words, the pixels included in each first pixel unit 16 and in each second pixel unit 18 are sequentially the blue pixel B, the green pixel G, the red pixel R, the blue pixel B, the green pixel G, and the red pixel R.

In each aforementioned embodiment, each displaying pixel includes three pixels configured to display different color images. For example, the three pixels can be the red pixel R, the blue pixel B, and the green pixel G, i.e. C is a multiple of 3. But the displaying pixels of the flat display device of the present invention are no limited to be the pixels of three colors, and can include the pixels of four colors or more colors.

Figure 10:
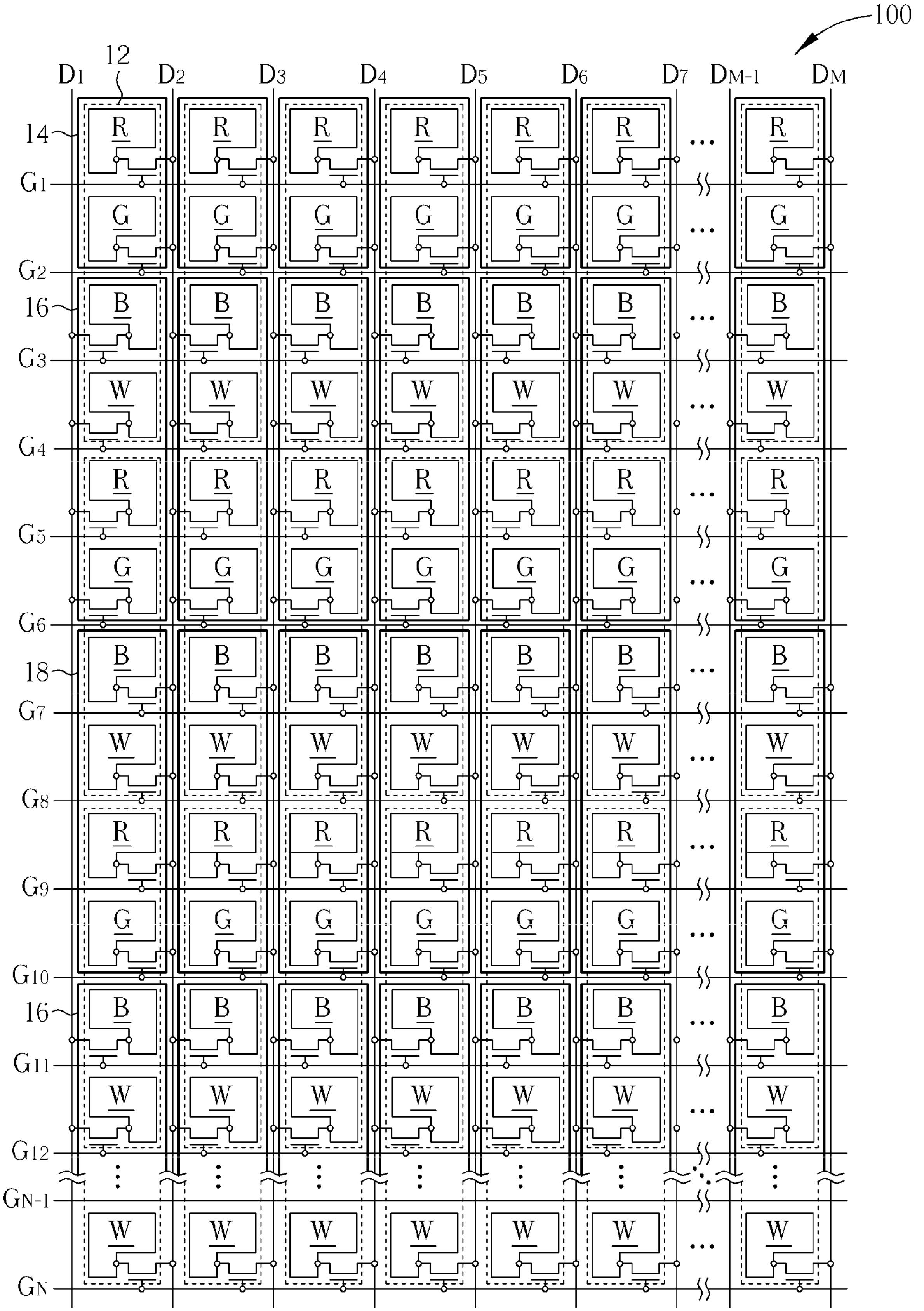
FIG. 10 is a schematic diagram illustrating an array substrate according to an eighth preferred embodiment of the present invention.

Please refer to FIG. 10. FIG. 10 is a schematic diagram illustrating an array substrate 100 according to an eighth preferred embodiment of the present invention. As shown in FIG. 10, each displaying pixel 12 of the present embodiment includes four pixels, and the color arrangement of the pixels of each displaying pixel 12 is in a sequence of the red pixel R, the green pixel G, the blue pixel B, and the white pixel W, but is not limited. Each buffering pixel unit 14 has two pixels, and each first pixel unit 16 and each second pixel unit 18 respectively have four pixels. The four pixels are one blue pixel B, one white pixel W, one red pixel R, and one green pixel G, i.e. A is equal to 4, D is equal to 2, and C is equal to 4. In other words, the pixels included in each first pixel unit 16 and in each second pixel unit 18 are sequentially the blue pixel B, the white pixel W, the red pixel R, the green pixel G.

In the present embodiment, each displaying pixels 12 can include more than four pixels, and the colors may include or be selected from the group consisting of red, green, blue, white, yellow, magenta, and cyan, but not limited. Each first pixel unit 16 and each second pixel unit 18 respectively may have four or more than four pixels, and the colors may include or be selected from the group consisting of red, green, blue, white, yellow, magenta, and cyan, but not limited.

Figure 11:
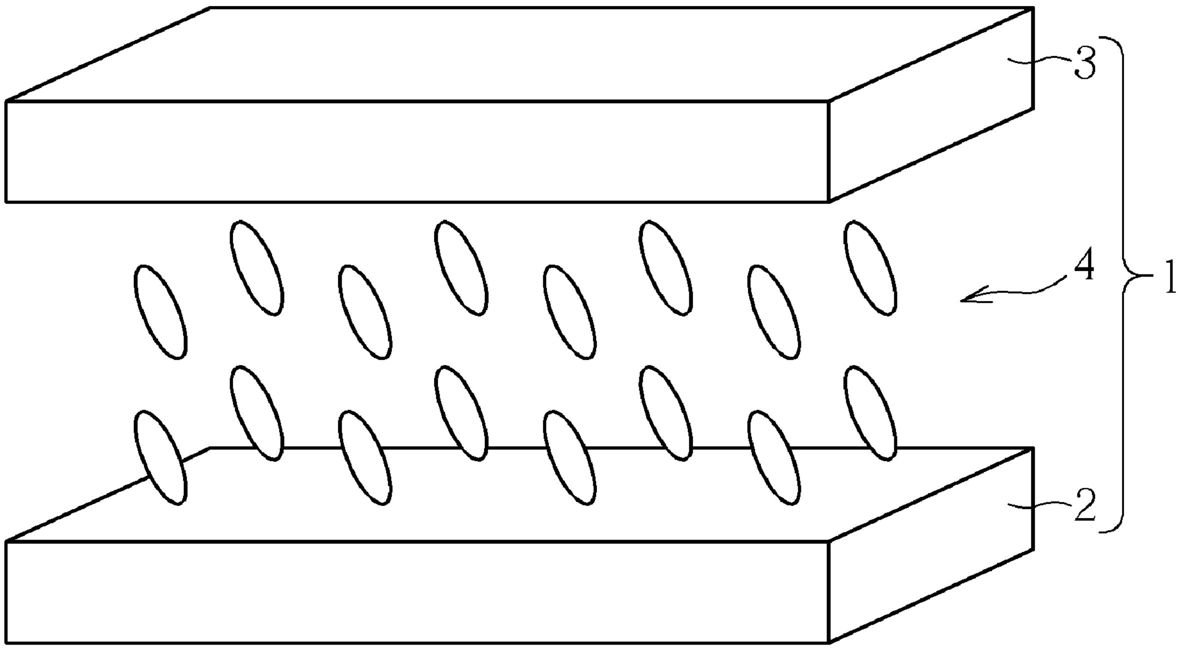
FIG. 11 is a schematic diagram illustrating a flat display device according to a ninth preferred embodiment of the present invention.

Please refer to FIG. 11. FIG. 11 is a schematic diagram illustrating a flat display device 1 according to a ninth preferred embodiment of the present invention. The flat display device 1 includes an array substrate 2 as recited in any aforementioned embodiment, an opposite substrate 3, and a liquid crystal layer 4. The liquid crystal layer 4 is disposed between the array substrate 2 and the opposite substrate 3. In the present embodiment, the liquid crystal display device is utilized as an example, but is not limited. Any flat display device including the array substrate 2 of each embodiment of the present invention is in the range of the present invention.

In summary, in the array substrate of each embodiment of the present invention, the pixels in the same column further include a plurality of first pixel units and second pixel units. Each first pixel unit includes more than three pixels and each second pixel unit includes more than three pixels, where the first pixel units and the second pixel units are electrically connected with different data lines, respectively. Accordingly, when displaying vertical stripe patterns, the coupling effect on the common signal resulted from the high-low level alterations of data signals can be decreased. Thus, generation of the crosstalk effect can be reduced to improve the displaying quality Those skilled in the art will readily observe that numerous modifications and alterations of the device and method may be made while retaining the teachings of the invention.

What is claimed is:

1. An array substrate, comprising:
- a plurality of gate lines;
- a plurality of data lines, intersecting with the gate lines to form a plurality of pixel regions; and
- a plurality of pixels, respectively disposed in each of the corresponding pixel regions;
- wherein the pixels comprise a plurality of buffering pixel units, a plurality of first pixel units, and a plurality of second pixel units, the quantity of pixels of each of the first pixel units is A, the quantity of pixels of each of the second pixel units is A, the quantity of pixels of each of the buffering pixel units is D, where A is a positive integer greater than or equal to 3, D is a positive integer smaller than A, each of the buffering pixel units is disposed between any two adjacent data lines and corresponding to an endpoint of each of the data line, the first pixel units and the second pixel units, which are disposed between any two adjacent data lines, follow each of the corresponding buffer pixel units along an extending direction of the data line, the first pixel units and the second pixel units disposed between any two adjacent data lines are arranged alternately, the first pixel units are electrically connected with one of the two adjacent data lines, and the second pixel units are electrically connected with the other data line of the two adjacent data lines.

2. The array substrate of claim 1, wherein the pixels disposed between any two adjacent data lines are electrically connected with the different gate lines, respectively.

3. The array substrate of claim 1, wherein the pixels of each first pixel unit have C kinds of colors, C is a positive integer greater than or equal to 3 and is a factor of A, and color arrangement sequences of the pixels of the first pixel units are identical.

4. The array substrate of claim 3, wherein the pixels of each second pixel unit have C kinds of colors, and a color arrangement sequence of the pixels in each of the second pixel units is identical to that of the pixels in each of the first pixel units.

5. The array substrate of claim 1, wherein a color of a first pixel in each of the first pixel units is identical to a color of a first pixel in each of the second pixel units.

6. The array substrate of claim 1, wherein the data lines are driven by a column inversion method.

7. The array substrate of claim 6, wherein a color of a first pixel in each of the first pixel units is identical to a color of a first pixel in each of the second pixel units.

8. An array substrate, comprising:
- a plurality of gate lines;
- a plurality of data lines, intersecting with the gate lines to form a plurality of pixel regions; and
- a plurality of pixels, respectively disposed in each of the corresponding pixel regions;
- wherein the pixels comprise a plurality of first pixel units and a plurality of second pixel units, the quantity of pixels of each of the first pixel units is A, the quantity of pixels of each of the second pixel units is A, where A is a positive integer greater than or equal to 3, the first pixel units and the second pixel units are disposed between any two adjacent data lines and arranged along an extending direction of the data line, the first pixel units and the second pixel units disposed between any two adjacent data lines are arranged alternately, the first pixel units are electrically connected with one of the two adjacent data lines, the second pixel units are electrically connected with the other data line of the two adjacent data lines, the pixels of each first pixel unit have C kinds of colors, the pixels of each second pixel unit have C kinds of colors, C is a positive integer greater than or equal to 3 and is a factor of A, and a color arrangement sequence of the pixels in each of first pixel units is identical to that of the A number of pixels in each of the second pixel units.

9. The array substrate of claim 8, wherein the pixels disposed between any two adjacent data lines are electrically connected with the different gate lines, respectively.

10. The array substrate of claim 8, wherein a color of a first pixel in each of the first pixel units is identical to a color of a first pixel in each of the second pixel units.

11. The array substrate of claim 8, wherein the data lines are driven by a column inversion method.

12. The array substrate of claim 8, wherein the C kinds of colors are selected from the group consisting of red, green, blue, white, yellow, magenta, and cyan.

13. A flat display device, comprising the array substrate according to claim 1.

14. A flat display device, comprising the array substrate according to claim 8.

* * * * *